US008251349B2

(12) United States Patent
Drake

(10) Patent No.: US 8,251,349 B2
(45) **Date of Patent: *Aug. 28, 2012**

(54) APPARATUSES AND METHODS FOR AN IMPROVED VEHICLE JACK

(75) Inventor: Daniel Vernon Drake, Wichita, KS (US)

(73) Assignee: MoJack Distributors, LLC, Wichita, KS (US)

(*) Notice: Subject to any disclaimer, the term of this patent is extended or adjusted under 35 U.S.C. 154(b) by 0 days.

This patent is subject to a terminal disclaimer.

(21) Appl. No.: 13/275,234

(22) Filed: Oct. 17, 2011

(65) Prior Publication Data

US 2012/0032124 A1 Feb. 9, 2012

Related U.S. Application Data

(63) Continuation of application No. 12/477,563, filed on Jun. 3, 2009, now Pat. No. 8,141,850.

(60) Provisional application No. 61/108,399, filed on Oct. 24, 2008.

(51) Int. Cl.
*B60P 1/14* (2006.01)
*B66F 7/02* (2006.01)

(52) U.S. Cl. ......................... 254/4 C; 254/4 R; 254/134

(58) Field of Classification Search .................. 254/4 C, 254/4 B, 4 R, 6 C, 6 B, 6 R, 12, 112, 108; 187/210, 208, 207, 216
See application file for complete search history.

(56) References Cited

U.S. PATENT DOCUMENTS

| | | | | |
|---|---|---|---|---|
| 652,836 | A | 7/1900 | Covert | |
| 1,554,120 | A | 9/1925 | Mosher | |
| 1,920,350 | A * | 8/1933 | Bourdon | 254/131 |
| 2,551,483 | A * | 5/1951 | Bartoe | 414/428 |
| 2,640,615 | A * | 6/1953 | Wedel | 414/428 |
| 2,857,985 | A * | 10/1958 | Simmons, Sr. | 187/207 |

(Continued)

FOREIGN PATENT DOCUMENTS

DE 3715349 A1 * 12/1987

(Continued)

OTHER PUBLICATIONS

International Search Report of corres PCT/US2010/024902 dated Jun. 9, 2010.

(Continued)

*Primary Examiner* — Lee D Wilson
*Assistant Examiner* — Tyrone V Hall, Jr.
(74) *Attorney, Agent, or Firm* — Spencer Fane Britt + Browne LLP

(57) ABSTRACT

Various embodiments of a vehicle jack include a base, an upright support mounted adjacent to and extending upwardly from the base, a toothed rack, a toothed bar pin, and a release handle. The toothed rack has a first end and a second end and defines a plurality of ratchet troughs therebetween, and the toothed rack is mounted adjacent the upright support. The ratchet assembly is adapted to move along a path defined by the upright support, and the toothed bar pin, which is mounted adjacent the ratchet assembly, is adapted to selectively engage a portion of the toothed rack adjacent one of the plurality of ratchet troughs as the ratchet assembly moves along the path. The release handle is mounted adjacent the second end of the toothed rack, and the release handle is adapted to selectively disengage the toothed bar pin from one of the plurality of ratchet troughs.

22 Claims, 10 Drawing Sheets

U.S. PATENT DOCUMENTS

| | | | | | |
|---|---|---|---|---|---|
| 2,867,409 | A | * | 1/1959 | Southerwick | 254/2 B |
| 2,947,513 | A | | 8/1960 | Nolden | |
| 2,992,811 | A | * | 7/1961 | Turner | 254/4 B |
| 3,038,700 | A | | 6/1962 | Ascherl | |
| 3,215,402 | A | * | 11/1965 | Hott et al. | 254/7 B |
| 3,225,868 | A | * | 12/1965 | Barnes | 187/231 |
| 3,306,579 | A | | 2/1967 | Campbell | |
| 3,378,154 | A | * | 4/1968 | Mousel | 414/428 |
| 3,924,763 | A | * | 12/1975 | Pigeon | 414/563 |
| 3,951,286 | A | * | 4/1976 | Horst | 414/444 |
| 4,030,697 | A | * | 6/1977 | Robinson | 254/8 R |
| 4,066,243 | A | | 1/1978 | Johnson | |
| 4,123,038 | A | | 10/1978 | Meyrs | |
| 4,421,209 | A | * | 12/1983 | Vermette et al. | 187/235 |
| 4,473,237 | A | | 9/1984 | Lind | |
| 4,549,721 | A | | 10/1985 | Stone | |
| 4,564,207 | A | | 1/1986 | Russ | |
| 4,632,627 | A | | 12/1986 | Swallows | |
| 4,645,181 | A | | 2/1987 | Schapansky | |
| 4,674,943 | A | | 6/1987 | Newpor | |
| 4,684,310 | A | * | 8/1987 | Stange | 414/427 |
| 4,737,065 | A | * | 4/1988 | Ju | 414/490 |
| 4,984,657 | A | * | 1/1991 | Burns | 187/207 |
| 5,000,423 | A | | 3/1991 | Snickers | |
| 5,100,283 | A | * | 3/1992 | Carty | 414/590 |
| 5,123,802 | A | * | 6/1992 | Bell | 414/563 |
| 5,176,487 | A | * | 1/1993 | Flitton | 414/428 |
| 5,326,216 | A | | 7/1994 | Russ | |
| 5,352,083 | A | * | 10/1994 | Roberts et al. | 414/477 |
| 5,358,217 | A | | 10/1994 | Dach | |
| 5,366,338 | A | * | 11/1994 | Mortensen | 414/563 |
| 5,632,475 | A | * | 5/1997 | McCanse | 269/17 |
| 5,711,512 | A | | 1/1998 | Kauffman | |
| 5,984,616 | A | * | 11/1999 | Youmans et al. | 414/563 |
| 6,330,997 | B2 | | 12/2001 | McGlaun | |
| 6,439,346 | B1 | * | 8/2002 | Gradziuk | 187/216 |
| 6,474,626 | B1 | | 11/2002 | Box | |
| D468,512 | S | | 1/2003 | Hernandez | |
| 6,516,597 | B1 | | 2/2003 | Samejima et al. | |
| 6,601,825 | B2 | * | 8/2003 | Bressner et al. | 254/4 R |
| 6,769,668 | B2 | | 8/2004 | Siglock | |
| 6,921,095 | B2 | * | 7/2005 | Middleby | 280/47.29 |
| 7,111,444 | B1 | | 9/2006 | Morris | |
| 7,740,439 | B1 | * | 6/2010 | Browning et al. | 414/428 |
| 7,823,694 | B2 | | 11/2010 | Motes | |
| 8,141,850 | B2 | | 3/2012 | Drake | |
| 2004/0076501 | A1 | * | 4/2004 | McGill et al. | 414/607 |
| 2005/0253122 | A1 | * | 11/2005 | Jones | 254/88 |
| 2006/0045710 | A1 | * | 3/2006 | Hiebert | 414/631 |
| 2006/0151247 | A1 | | 7/2006 | Raffler | |
| 2006/0278855 | A1 | * | 12/2006 | Krug | 254/4 B |
| 2006/0278856 | A1 | | 12/2006 | Krug | |
| 2009/0134374 | A1 | | 5/2009 | Krug | |
| 2010/0102284 | A1 | | 4/2010 | Drake | |
| 2010/0283016 | A1 | | 11/2010 | Drake | |
| 2011/0253995 | A1 | | 10/2011 | Kato | |
| 2012/0112143 | A1 | | 5/2012 | Gann | |

FOREIGN PATENT DOCUMENTS

| | | |
|---|---|---|
| FR | 2781779 | 2/2000 |
| GB | 885599 | 12/1961 |
| JP | 63 021695 | 2/1988 |
| JP | 2005 145571 | 6/2005 |
| WO | WO 9626886 | 9/1996 |
| WO | WO 9911556 | 3/1999 |
| WO | WO 2010047897 | 4/2010 |

OTHER PUBLICATIONS

International Search Report of corres PCT/US2009/057092, dated Dec. 15, 2009.

Notice of Allowance mailed Nov. 28, 2011 in corres U.S. Appl. No. 12/477,563, filed Jun. 3, 2009.

Notice of Allowance mailed Jun. 24, 2010 in U.S. Appl. No. 11/147,571, filed Jun. 8, 2005.

Written Opinion of corres PCT/US2010/024902 dated Jun. 9, 2010.

Written Opinion of corres PCT/US2009/057092, dated Dec. 15, 2009.

OA mailed Apr. 8, 2008 in connection with related U.S. Appl. No. 11/327,264, filed Jan. 7, 2006 (abandoned).

OA mailed Feb. 8, 2008 in connection with related U.S. Appl. No. 11/327,264, filed Jan. 7, 2006 (abandoned).

OA mailed Jul. 18, 2008 in connection with related U.S. Appl. No. 11/327,264, filed Jan. 7, 2006 (abandoned).

OA mailed Jul. 12, 2011 in corres U.S. Appl. No. 12/477,563, filed Jun. 3, 2009.

OA mailed May 9, 2008 in U.S. Appl. No. 11/147,571, filed Jun. 8, 2005.

OA mailed Feb. 28, 2007 in connection with related U.S. Appl. No. 11/147,571, filed Jun. 8, 2005.

OA mailed Jul. 30, 2008 in U.S. Appl. No. 11/147,571, filed Jun. 8, 2005.

OA mailed Aug. 28, 2007 in U.S. Appl. No. 11/147,571, filed Jun. 8, 2005.

* cited by examiner

APPARATUSES AND METHODS FOR AN IMPROVED VEHICLE JACK

CROSS-REFERENCE TO RELATED APPLICATIONS

This application is a continuation of U.S. application Ser. No. 12/477,563, filed Jun. 3, 2009, entitled "Apparatuses and Methods for an Improved Vehicle Jack," which claims priority from U.S. Provisional Application No. 61/108,399 filed Oct. 24, 2008, which are herein incorporated by reference in their entirety.

BACKGROUND OF THE INVENTION

Numerous jacks exist to address the need of raising vehicles (e.g., riding lawnmowers, all-terrain vehicles (ATV)) smaller than typical automobiles for the purposes of performing unexpected repairs and routine maintenance. Many such jacks only have a single contact point structure. Depending on a variety of external factors, the single contact point structure often proves unstable and unsafe. Many such jacks rely upon a hydraulic cylinder as a support mechanism. Depending on a variety of factors, the hydraulic cylinder may become prone to inadvertent slippage. In either scenario, a user of the jack may suffer serious injuries. Accordingly, a need exists for an improved vehicle jack that, for example, addresses the problems discussed above.

BRIEF SUMMARY OF THE INVENTION

Various embodiments of the invention are directed to a vehicle jack that includes a base, an upright support, a toothed rack, a winch, a lifting frame, a ratchet assembly, a toothed bar pin, and a release handle. The upright support has a first end and a second end, and the first end is mounted adjacent and extends upwardly from the base. The toothed rack has a first end and a second end and defines a plurality of ratchet troughs between the first end and the second end of the toothed rack. The toothed rack is mounted adjacent the upright support. The winch is mounted adjacent the second end of the upright support. The lifting frame includes (1) a vehicle part engaging portion and (2) an elongated connecting member adapted to attach the lifting frame to the winch. The ratchet assembly is adapted to move along a path defined by the upright support, and the toothed bar pin is mounted adjacent the ratchet assembly. The toothed bar pin is further adapted to selectively engage a portion of the toothed rack adjacent one of the plurality of ratchet troughs as the ratchet assembly moves along the path defined by the upright support. The release handle is mounted adjacent the second end of the toothed rack, and the release handle is further adapted to selectively disengage the toothed bar pin from one of the plurality of ratchet troughs.

In addition, a method of operating a vehicle jack according to various embodiments includes the steps of: (1) providing a support frame; (2) providing a toothed rack mounted adjacent the support frame, the toothed rack comprising a first end and a second end and defining a plurality of ratchet troughs between the first end and the second end; (3) providing a release handle mounted adjacent the second end of the toothed rack; (4) providing a lifting frame adjacent the support frame, the lifting frame comprising at least one roller and a ratchet pin adapted to selectively engage a portion of the toothed rack adjacent one of the plurality of ratchet troughs; (5) moving the lifting frame from a first position located between the first and second ends of the toothed rack to a second position located between the first and second ends of the toothed rack, the second position being vertically higher than the first position; (6) when the lifting frame is located at the second position, positioning the ratchet pin within a particular one of the plurality of ratchet troughs; (7) using the release handle to selectively move the toothed rack so that the ratchet pin is no longer disposed within the particular one of the plurality of ratchet troughs; and (8) moving the lifting frame from the second position between the first and second ends of the toothed rack to the first position between the first and second ends of the toothed rack, the first position being vertically lower than the second position.

BRIEF DESCRIPTION OF THE SEVERAL VIEWS OF THE DRAWING(S)

In the description below, reference will be made to the accompanying drawings, which are not necessarily drawn to scale. Like numbers refer to like elements throughout.

DETAILED DESCRIPTION OF THE INVENTION

Various embodiments of the present invention now will be described more fully hereinafter with reference to the accompanying drawings, in which some, but not all embodiments of the invention are shown. Indeed, the invention may be embodied in many different forms and should not be construed as limited to the embodiments set forth herein. Rather, these embodiments are provided so that this disclosure will satisfy applicable legal requirements. Like numbers refer to like elements throughout.

Structure of Various Embodiments of the Invention

Figure 1:
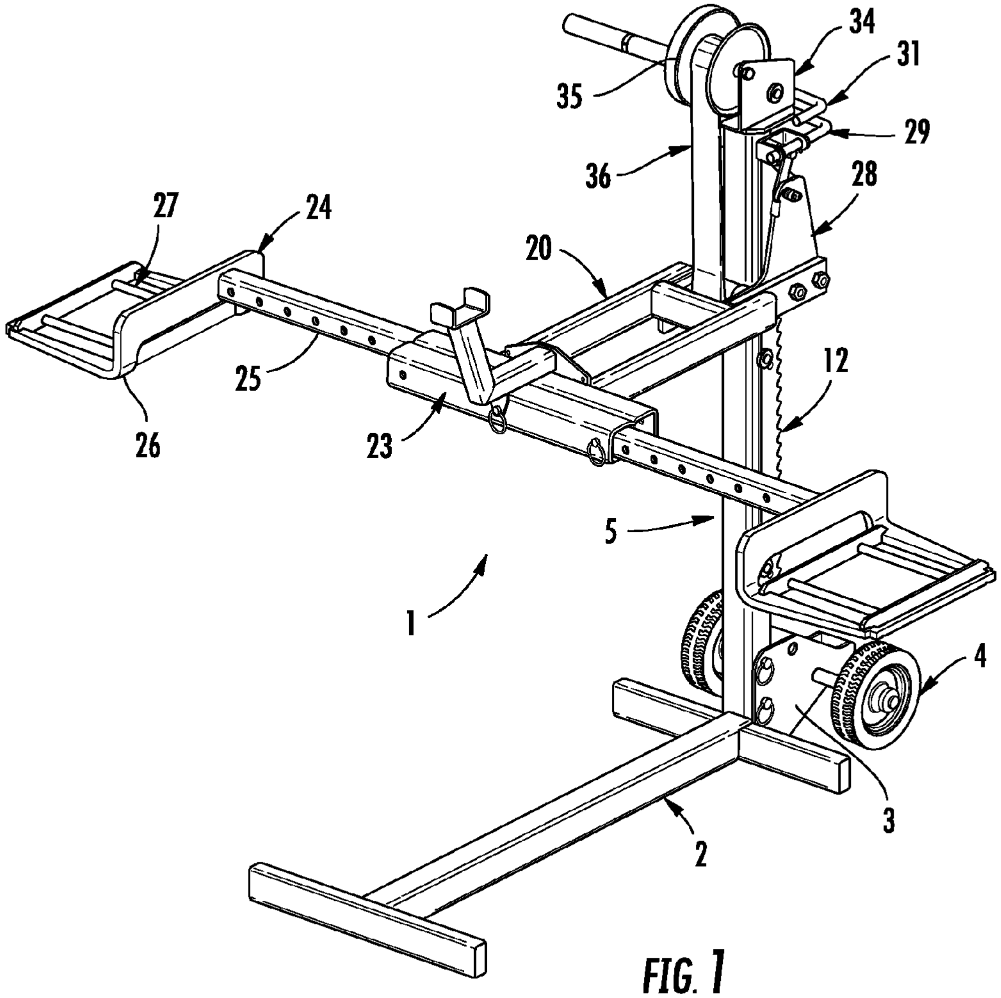
FIG. 1 is a perspective view of an improved vehicle jack according to a particular embodiment of the invention.

FIG. 1 shows a vehicle jack 1 according to a particular embodiment of the invention. As may be understood from this figure, in this embodiment, the vehicle jack 1 includes a base 2 that is generally I-shaped. An elongated upright support 5 is mounted to adjacent (e.g., to) the base 2 so that the upright support 5 extends upwardly away from the base 2 in a substantially vertical (e.g., vertical) orientation. In particular embodiments of the invention, a wheel bracket 3 is mounted to the vehicle jack 1 adjacent to the point at which the base 2 attaches to the upright support 5. This wheel bracket 3 is adapted to support one or more wheels 4 that are used to facilitate the movement of the vehicle jack 1 along a support surface. In particular embodiments, the vehicle jack 1 also includes a base handle 31 to facilitate movement of the vehicle jack 1. In the embodiment shown in FIG. 1, the base handle 31 is mounted adjacent an upper end of the upright support 5.

In the embodiment shown in FIG. 1, the vehicle jack 1 includes a lifting frame 20. As may be understood from FIG. 1, the lifting frame 20 generally includes a central support 23, a ratchet assembly 28, and at least one (e.g., two, in the embodiment shown in FIG. 1) wheel support assemblies 24. In various embodiments of the invention, each wheel support assembly 24 includes a wheel support 26 and a wheel support mounting bar 25 that extends between the central support 23 and the wheel support 26. In various embodiments of the invention, each wheel support mounting bar 25 is slideably attached adjacent the central support 23. In particular embodiments, each wheel support mounting bar 25 includes an adjustment mechanism (e.g., a pin/hole arrangement such as the arrangement shown in FIG. 1) that is adapted: (1) for allowing a user to selectively adjust the lateral position of the wheel support mounting bar 25 (and, therefore, the corresponding wheel support 26 relative to the central support 23); and (2) selectively maintaining the wheel support mounting bar 25 in any of a plurality of desired lateral positions.

In various embodiments of the invention, the ratchet assembly 28 of the lifting frame 20 is attached adjacent (e.g., to) the upright support 5 to permit movement of the ratchet assembly 28 (and, therefore, the lifting frame 20) along the length of the upright support 5. In the embodiment shown in FIG. 2, travel of the ratchet assembly 28 along the length of the upright support 5 is limited in the downward direction by a horizontal bar 75 disposed adjacent a lower end 9 of the upright support 5. The vehicle jack 1, according to various embodiments of the invention, includes a lifting frame elevation assembly for moving the ratchet assembly 28 and the lifting frame 20 upwardly relative to the upright support 5. In the embodiment shown in FIG. 1, the lifting frame elevation assembly includes a winch assembly 34 that is mounted adjacent (e.g., to) an upper end of the upright support 5. In various embodiments, this winch assembly 34 is automatically driven (e.g., via an electric motor). However, in the embodiment shown in FIG. 1, the winch assembly 34 is driven manually, via a hand crank.

In the embodiment shown in FIG. 1, the winch assembly 34 includes a brake winch 35 and a winch belt 36, each commonly known and understood in the art. In various embodiments of the invention, a first end of the winch belt 36 is attached adjacent (e.g., to) to the ratchet assembly 28 and a second end of the winch belt 36 is attached adjacent (e.g., to) the brake winch 35. Turning the brake winch 35 in a take-up direction winds the winch belt 36 about a take-up spool associated with the brake winch 35. This causes the winch belt 36 to move the ratchet assembly 28 upwardly along a length of the upright support 5. Similarly, turning the brake winch 35 in a belt release direction (which may be, for example, opposite to the take-up direction), causes the first end of the winch belt 36 to move away from the brake winch's take up spool. This, in turn, causes the ratchet assembly 28 to move downwardly along the length of the upright support 5. In various other embodiments (not shown), the winch assembly includes a chain or other elongated, flexible connecting member instead of the winch belt 36 shown in FIG. 1.

As may be understood from FIGS. 1, 2, 3A, and 3B, in particular embodiments, the vehicle jack 1 includes at least one toothed rack 12 that is mounted adjacent (e.g., to) the vehicle jack's upright support 5. In the embodiment shown, the toothed rack 12 includes two toothed bars 13 that are spaced apart from each other. However, in alternative embodiments, the toothed rack may include any other suitable rack structure, including those with less or more than two toothed bars 13. In the embodiment shown, each toothed bar 13 includes a first end 14 and a second end 15 and is mounted in a substantially vertical (e.g., vertical) orientation adjacent (e.g., to) a respective side surface of the upright support 5. Further, each toothed bar 13, according to a particular embodiment of the invention, defines a plurality of ratchet teeth 16 that extend outwardly from a rear edge of the toothed bar 13 (see FIG. 2). At least a portion of the plurality of ratchet teeth 16 of one of the toothed bars 13 is substantially horizontally aligned with at least a portion of the plurality of ratchet teeth 16 of the other toothed bar 13.

Figure 2:
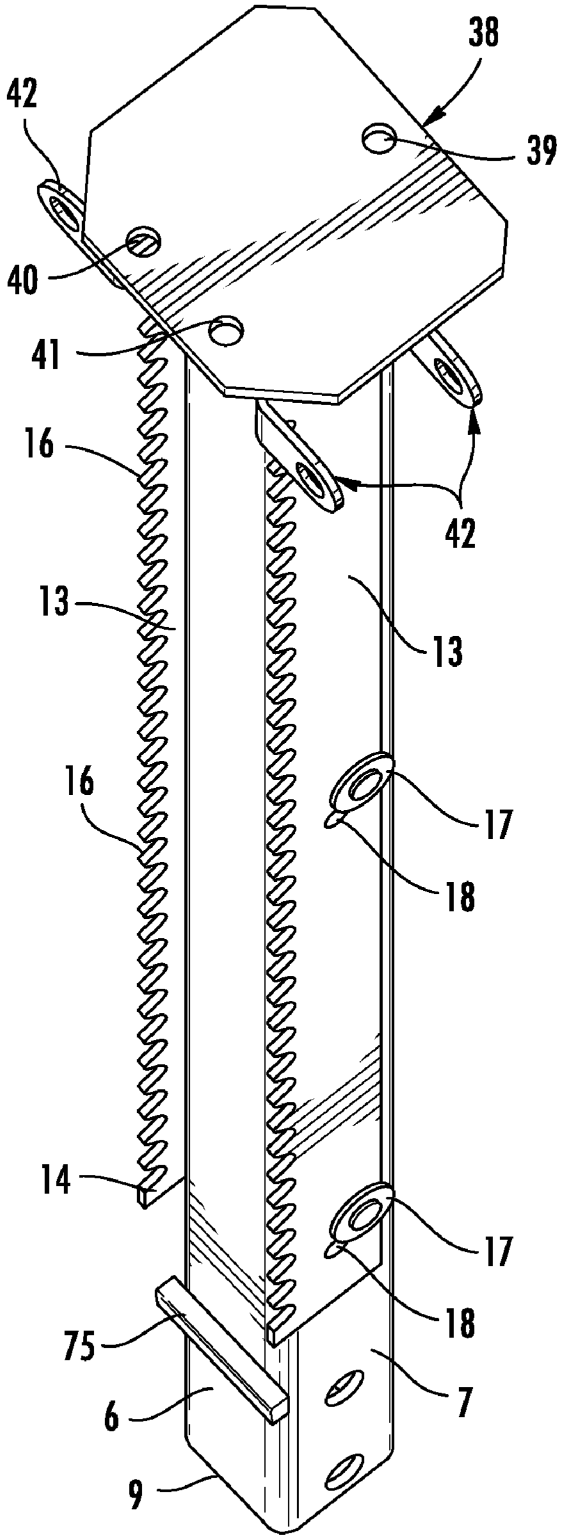
FIG. 2 is a perspective view of a vertical frame support of the vehicle jack of FIG. 1.
Figure 3A:
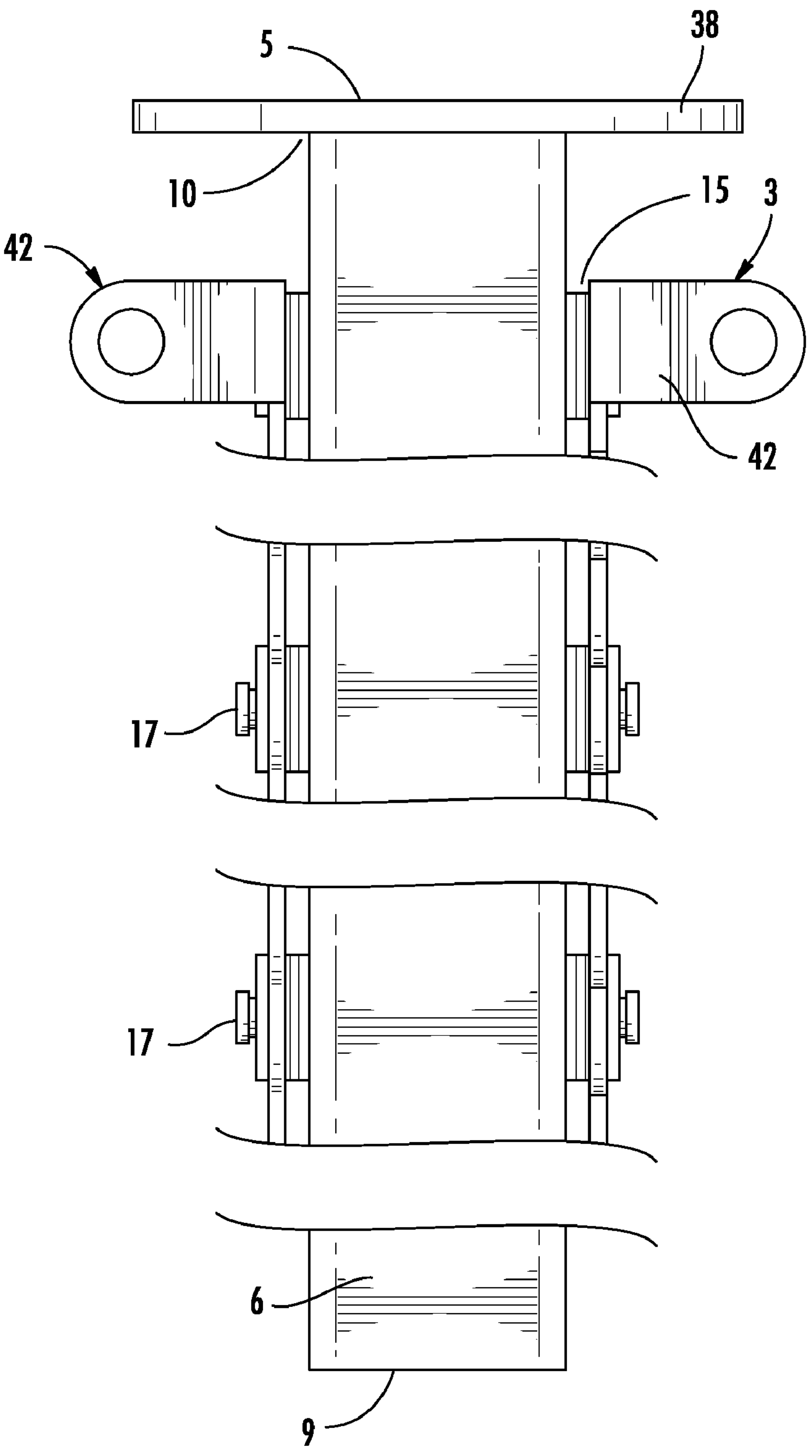
FIG. 3A is a front view of the vertical frame support of FIG. 2.
Figure 3B:
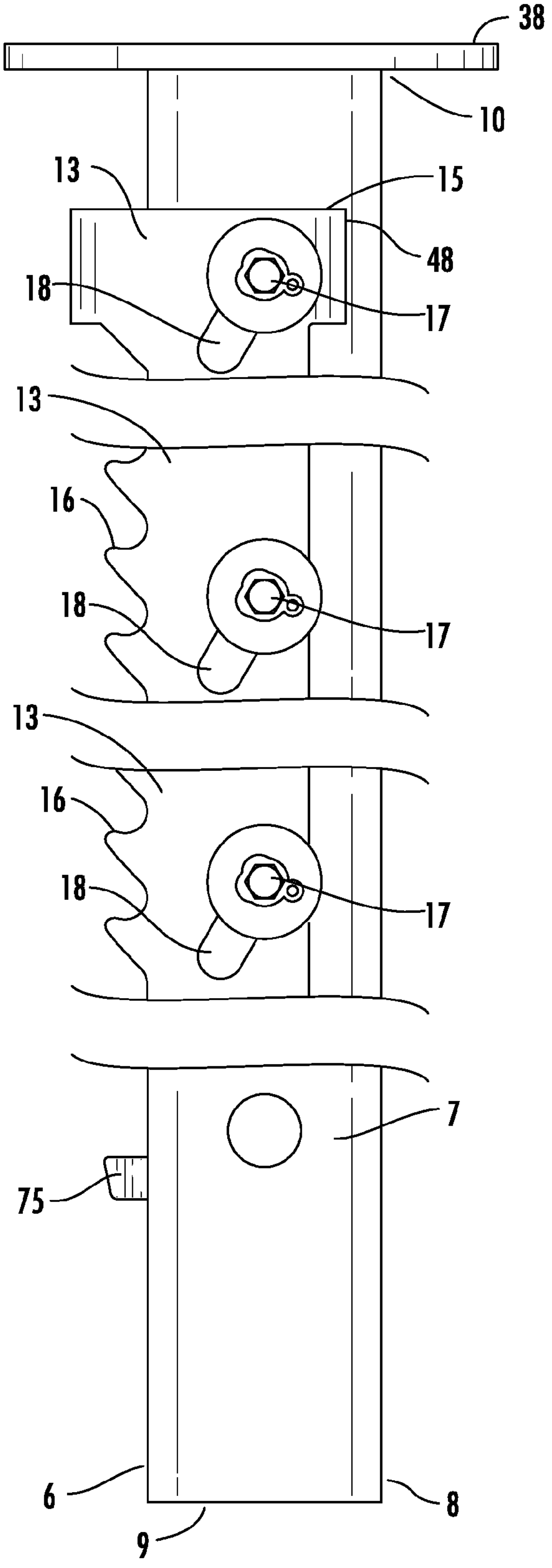
FIG. 3B is a side view of the vertical frame support of FIG. 2.

In particular, as may be understood from FIG. 2, in various embodiments of the invention, each toothed bar 13 defines at least two elongated, angled pin slots 18 designed to slideably receive a corresponding toothed bar mounting pin 17 (see FIG. 2). Each angled pin slot 18 is disposed between the rear edge of the toothed bar 13 and a front edge of the toothed bar 13 (which is opposite and spaced apart from the rear edge) such that an upper end of each slot 18 is disposed adjacent the front edge of the toothed bar 13 and a lower end of each slot 18 is disposed adjacent the rear edge of the toothed bar 13. In various embodiments of the invention, the respective toothed bar mounting pins 17 mount each toothed bar 13 to a respective one of the upright support's side surfaces 7. In alternative embodiments (not shown), the slots may have an alternative shape and/or orientation to that shown in FIG. 2, such as, for example, substantially L-shaped or substantially horizontal.

Figure 7:
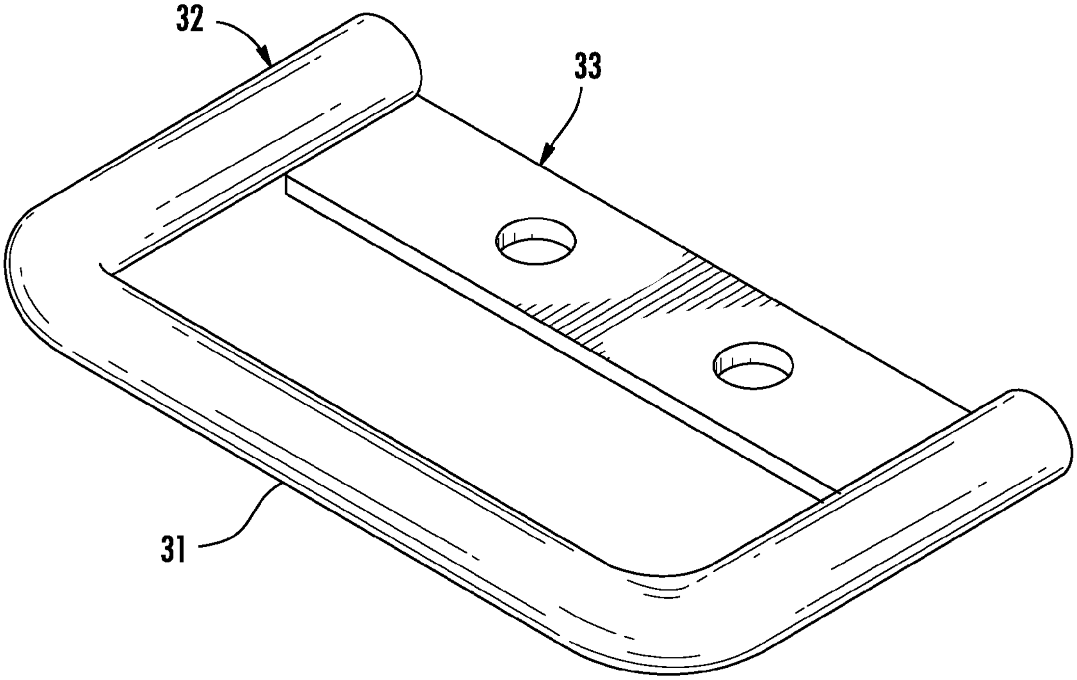
FIG. 7 is a perspective view of the base handle of the vehicle jack of FIG. 1.

In a particular embodiment of the invention, the upright support 5 includes a top plate 38 mounted adjacent (e.g., to) a second end 10 of the upright support 5. The top plate 38 includes a first hole 39 that may be used to receive a fastener for mounting the winch assembly 34 to the upright support 5. In various embodiments of the invention, the top plate 38 further includes a second hole 40 and a third hole 41 that may receive additional fasteners for mounting the base handle 31 to the upright support 5. As may be understood from FIG. 7, in a particular embodiment of the invention, the base handle 31 may include two arms 32 and a mounting plate 33 that extends between the arms 32. In a particular embodiment, the mounting plate 33 may be adapted to be attached adjacent a top surface of the top plate 38, as shown generally in FIG. 1, using one or more fasteners (e.g., bolts, screws, adhesive, clip, and/or other suitable fastener).

Figure 4:
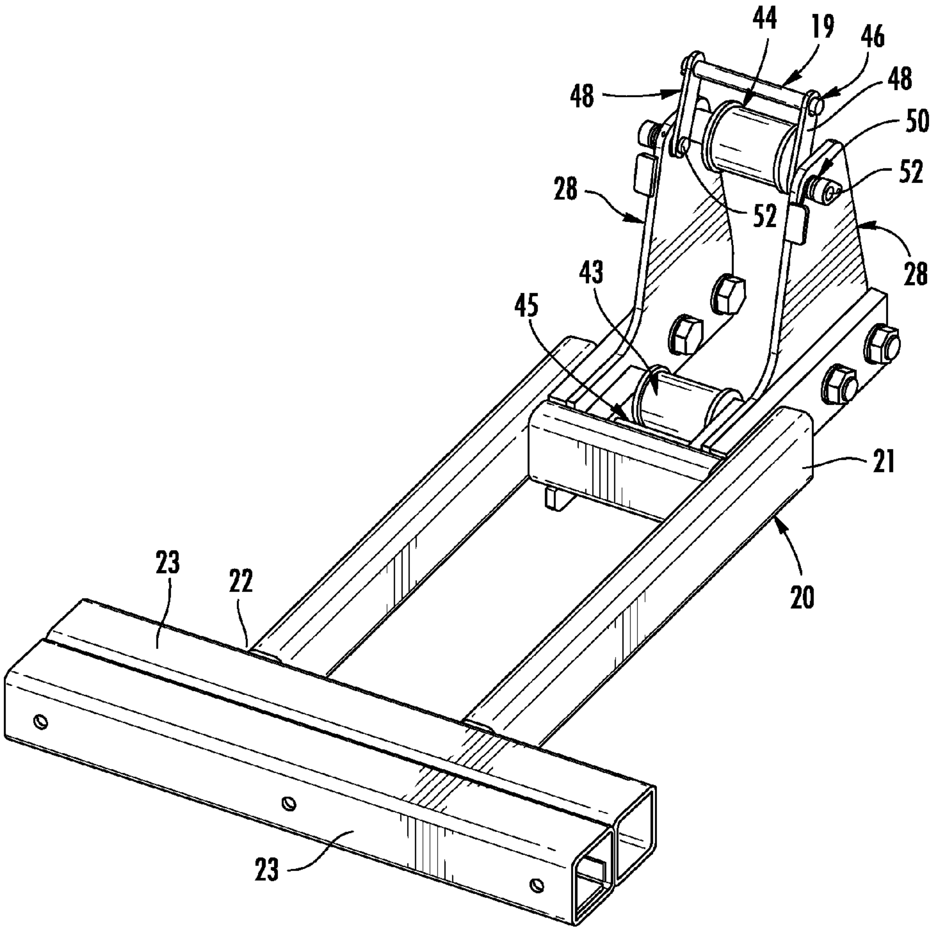
FIG. 4 is perspective view of one embodiment of a lifting frame of the vehicle jack of FIG. 1.

As may be understood from FIG. 4, the ratchet assembly 28, according to a particular embodiment of the invention, includes at least a first roller 43 and a second roller 44. In various embodiments of the invention, the first roller 43 is positioned adjacent a front surface 8 of the upright support 5, and the second roller 44 is positioned adjacent a rear surface 6 of the upright support 5 (see FIGS. 1 and 4). A channel is defined between the first 43 and second rollers 44, and the upright support 5 extends through the channel.

Figure 5:
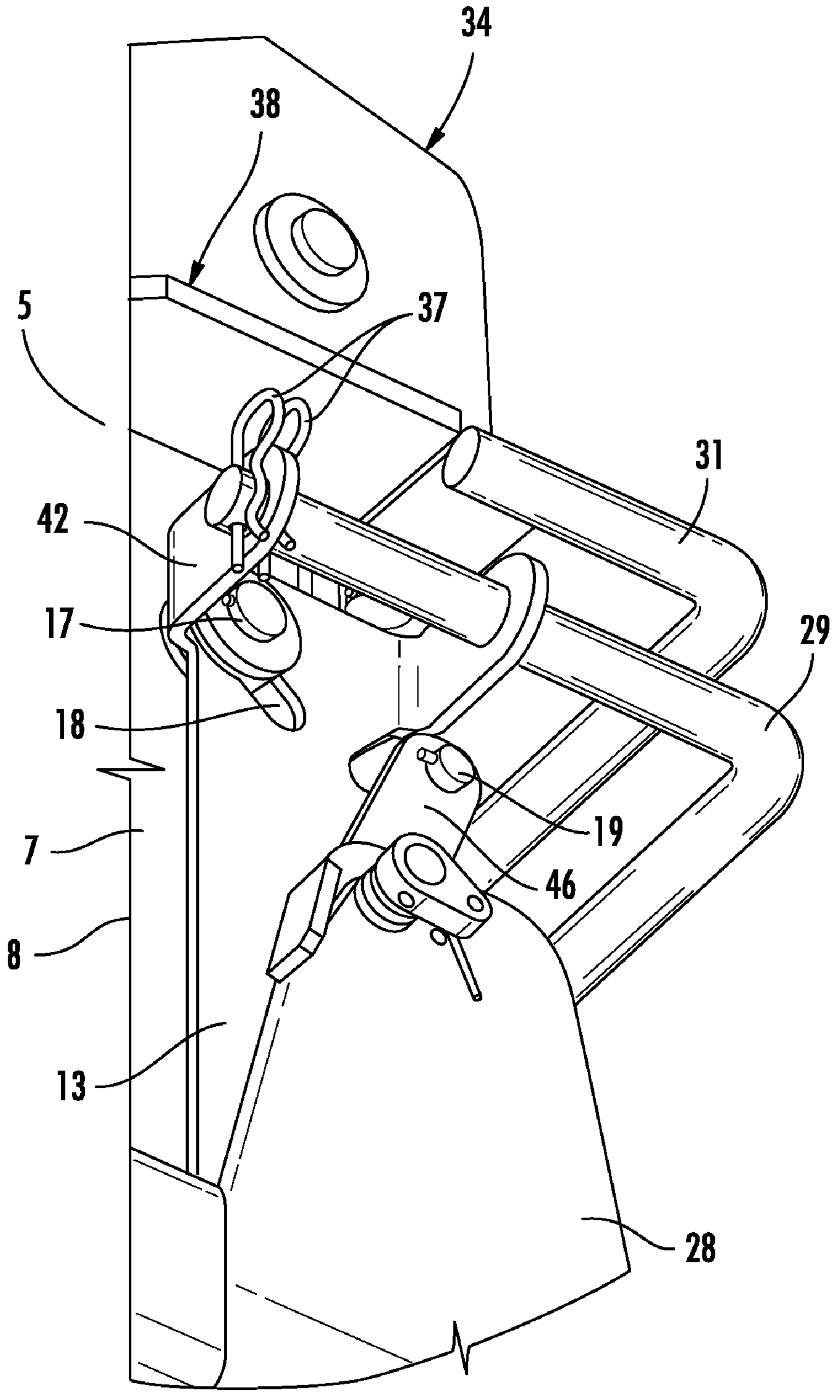
FIG. 5 is a perspective view of the safety stop release mechanism of the vehicle jack of FIG. 1.

The ratchet assembly 28, according to various embodiments of the invention, also includes a torque arm assembly 46 and a toothed bar engagement pin 19 (see FIGS. 4 and 5). In various embodiments of the invention, as described in greater detail below, the torque arm assembly 46 urges the toothed bar engagement pin 19 toward one of the plurality of troughs between the toothed rack's teeth 16 as the winch assembly 34 moves the ratchet assembly 28 vertically relative to the upright support 5. In a particular embodiment of the invention, the vertical movement of the ratchet assembly 28 is physically limited between a first end 14 of the toothed bar 13 and a second end 15 of the toothed bar 13. In an alternative embodiment of the invention, the vertical movement of the ratchet assembly 28 is physically limited between the horizontal bar 75 and the second end 15 of the toothed bar 13. As described in more detail below, in various embodiments, urging the toothed bar engagement pin 19 into a trough between the toothed rack's teeth 16 prevents inadvertent vertical movement of the ratchet assembly 28 relative to the toothed rack 12.

In the embodiment shown in FIG. 4, the torque arm assembly 46 includes two arms 48 that extend substantially upwardly from a rear side of the ratchet assembly 28 adjacent the second roller 44. A pin 52 or other suitable fastener couples a lower portion of each arm 48 to the ratchet assembly 28, and the toothed bar engagement pin 19 extends between upper portions of the two arms 48. A torsion spring 50 is disposed around each of the pins 52 to bias the arms 48 in a direction away from the rear side of the ratchet assembly 28.

In the embodiment shown in FIG. 1, the ratchet assembly 28 includes a winch belt pin 45 that attaches an end of the winch belt 36 to the lifting frame 20. In this embodiment, turning the brake winch 35 in a belt take-up direction winds the upper portion of the winch belt 36 about the brake winch's take-up spool. This, in turn, lifts the winch belt pin 45 which, in turn, moves the ratchet assembly 28 and the lifting frame 20 upwardly along a length of the upright support 5. In various embodiments of the invention, the movement of the winch belt pin 45 is limited by the second end 15 of the toothed bar 13 and the first end 14 of the toothed bar 13.

Figure 6:
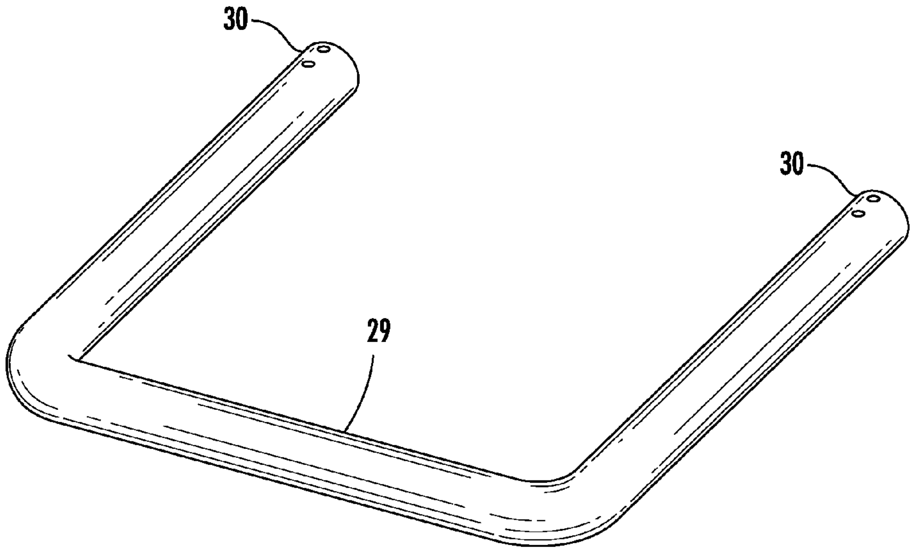
FIG. 6 is a perspective view of the release handle of the vehicle jack of FIG. 1.

As may be understood from FIG. 5, the toothed bar 13, according to a particular embodiment of the invention, includes at least two release handle mounting plates 42. In various embodiments, the release handle mounting plates 42 are positioned at the second end 15 of the toothed bar 13. The mounting plates 42 are adapted to support a release handle 29. In various embodiments of the invention, as may be understood from FIG. 6, the release handle 29 contains at least two mounting holes 30 that are used to facilitate locking the release handle 29 to the mounting plates 42 (e.g., via one or more fasteners, such as hair pins 37).

As previously disclosed, the ratchet assembly 28, according to the embodiment shown in FIG. 4, includes at least a first roller 43 disposed adjacent a front surface 8 of the upright support 5 and a second roller 44 disposed adjacent a rear surface 6 of the upright support 5. As may be understood from FIGS. 8 and 9, a ratchet assembly 128, according to an alternative embodiment of the invention, further includes at least two side rollers 155 disposed on opposing and spaced apart sides of the channel defined between the first 43 and second rollers 44. The side rollers 155 engage opposing and spaced apart side surfaces of the upright support 5 as the upright support 5 travels through the channel.

Figure 8:
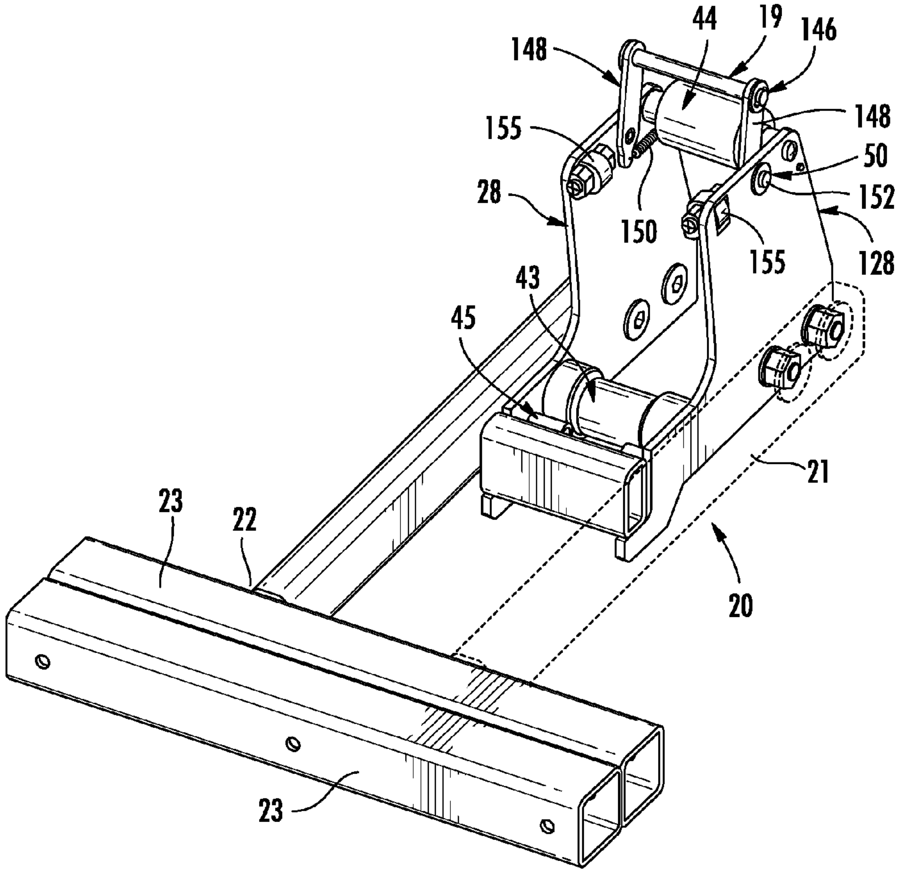
FIG. 8 is a perspective view of an alternative embodiment of a lifting frame.
Figure 9:
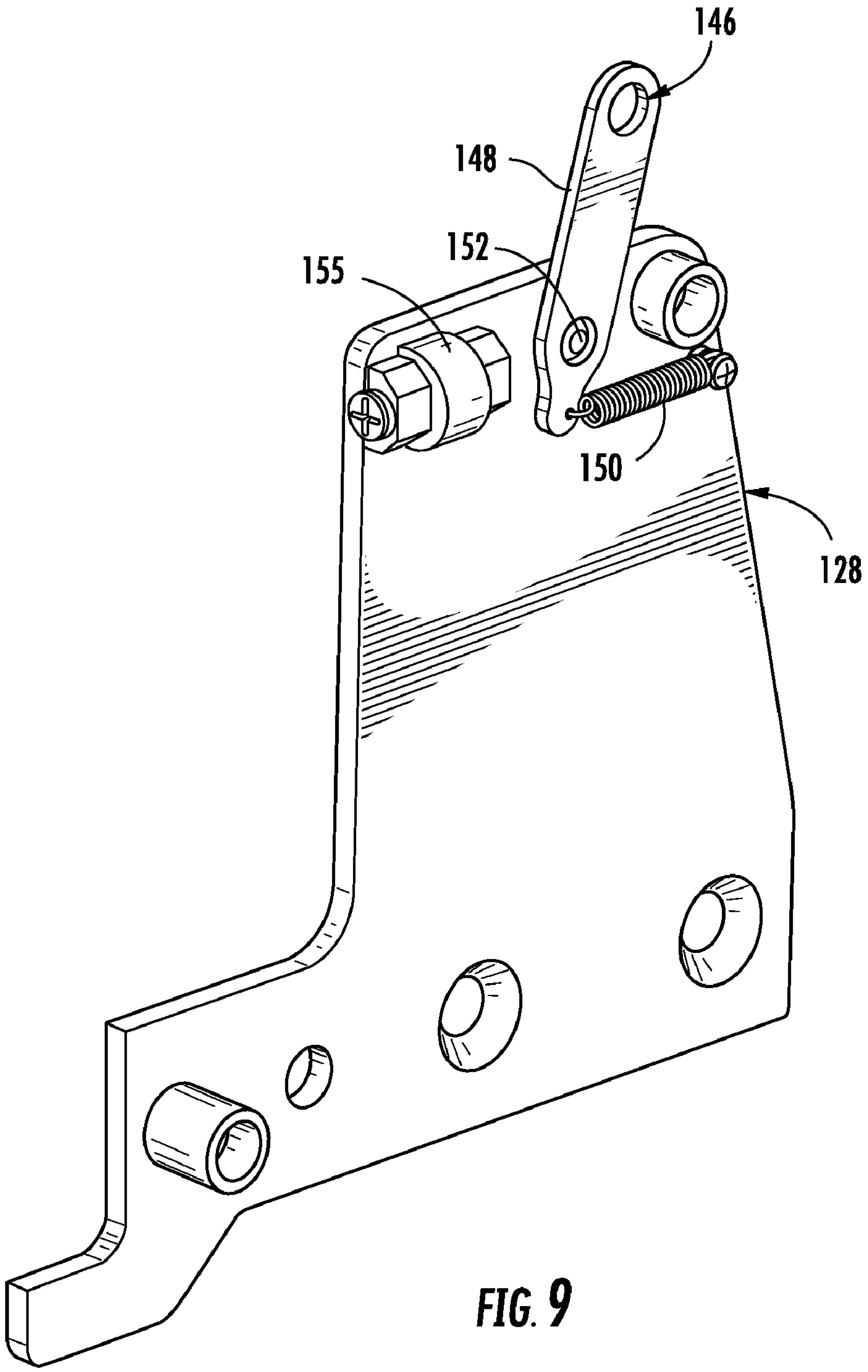
FIG. 9 is a perspective view of the ratchet assembly of the lifting frame of FIG. 8.

FIGS. 8 and 9 also illustrate an alternative embodiment of a torque arm assembly 146 and the ratchet assembly 128. The torque arm assembly 146 includes two arms 148 that extend substantially upwardly from a rear side of the ratchet assembly 128 adjacent the second roller 44. A pin 152 or other suitable fastener couples a lower portion of each arm 148 to the ratchet assembly 128, and the toothed bar engagement pin 19 extends between upper portions of the two arms 148. One end of a helical spring 150 is attached to each of the pins 152 and an opposing end of the helical spring 150 is anchored with a screw 157 or other suitable fastener so as to bias the arms 148 in a direction away from the rear side of the ratchet assembly 128. In other various embodiments (not shown), the arms and/or the engagement pin are biased using other suitable biasing means, such as another type of spring or using materials for the arms and/or engagement pin having an inherent resiliency.

Operation of Various Embodiments of the Invention

In particular embodiments, to use the vehicle jack 1, a user first adjusts the vehicle jack 1 so that the vehicle jack's wheel support assemblies 24 are in at least substantial lateral alignment with the two front wheels of a vehicle (e.g., a riding lawn mower). The user then lowers the jack's lifting frame 20 to a loading position in which the jack's wheel support assemblies 24 are disposed adjacent (e.g., on) a support surface (e.g., a support surface that is supporting the wheel jack 1). The user than moves the vehicle (e.g., a riding lawn mower) into a pre-lifting position in which each of the vehicle's front wheels is disposed on a respective one of the wheel support assemblies 24. In a particular embodiment, when the vehicle is in this position, each of the vehicle's front wheels is positioned so that the bottom portion of the wheel is disposed between two wheel support rollers 27 that are spaced apart within a respective one of the vehicle jack's wheel support assemblies 24.

Next, the user turns the handle of the brake winch 35 in a belt take-up direction, which causes the winch belt 36 to wind around the winch's take-up spool. This, in turn, causes the winch belt 36 to lift the vehicle jack's lifting frame 20 to an elevated position in which the wheel support assemblies 24 are elevated (e.g., by at least 6 inches) above the support surface that is supporting the vehicle jack 1.

As the lifting frame 20 is being moved from the loading position to the elevated position, the ratchet assembly 28 moves upwardly along a portion of the length of the upright support 5. As this occurs, the ratchet assembly's first roller 43 rolls along the upright support's front surface 8 and the ratchet assembly's second roller 44 rolls, between the respective toothed bars 13, along the upright support's rear surface 6. During this process, the toothed bar engagement pin 19 engages the outer surface of a first rack tooth on each of the two toothed bars 13 (e.g., the lowest tooth on each of the toothed bars 13) and, as the ratchet assembly 28 moves upwardly adjacent these first rack teeth, the toothed bar engagement pin 19 moves (e.g., rolls) along the outer perimeters of the first rack teeth. During this process, the toothed bar engagement pin 19 is urged toward (and thereby maintained in contact with) the first rack teeth by the torsion spring 50. After the toothed bar engagement pin 19 passes the peak portion of the first rack teeth, the toothed bar engagement pin 19 moves into two offset, downwardly sloping troughs defined between the first rack teeth and the toothed racks' second rack teeth (e.g., the second lowest teeth on the toothed bars 13). When in this position, the torsion spring 50 maintains the toothed bar engagement pin 19 in place within the troughs, and the first rack teeth cooperate to prevent the toothed bar engagement pin 19 from moving downwardly past the first rack teeth. In various embodiments, this serves as a safety mechanism that would prevent the lifting frame 20 from falling in the event that the brake associated with the winch mechanism 35 fails.

As the ratchet assembly 28 continues to move upwardly relative to the upright support 5, the toothed bar engagement pin 19 continues to move relative to various other pairs of rack teeth as described above in regard to the first and second pairs of rack teeth. During the ratchet assembly's upward movement relative to the toothed rack 12, the toothed bar engagement pin 19 intermittently snaps into place in the various downwardly sloping troughs between the rack's teeth.

When the vehicle's front wheels have been elevated sufficiently off of the ground to allow the user to perform the desired maintenance on the vehicle, the user stops cranking the vehicle jack's winch crank in the belt take-up direction. As a result, the toothed bar engagement pin 19 settles into a particular pair of troughs defined between two particular pairs of rack teeth. As noted above, this provides an additional safety feature that would prevent the lifting frame 20 from falling in the event that the brake on the winch assembly 34 fails.

When the user is ready to lower the vehicle (e.g., when the desired vehicle maintenance is complete) the user squeezes the release handle 29 toward the base handle 31 which, in turn, moves the release handle 29 upwardly toward the base handle 31. Due to the mechanical linking between the release handle 29 and the jack's toothed bars 13 (see FIG. 5), the upward movement of the release handle 29 causes the toothed bars 13 to, in turn, move upwardly. Due to the shape and angled orientation of the respective toothed bar pin slots 18 and the position of the toothed bar mounting pins 17 within the slots (see FIG. 2), as the toothed bars 13 move upwardly, they also move inwardly (or toward the front surface 8 of the upright support 5), away from the toothed bar engagement pin 19, until none of the toothed racks' teeth are positioned vertically below the toothed bar engagement pin 19. Next, while continuing to squeeze the release handle 29 toward the base handle 31, the user cranks the winch handle in the belt release direction. This causes the winch belt 36 to unwind off of the brake winch's take-up spool which, in turn, lowers the lifting frame 20. The user continues this process until the jack's lifting frame 20 returns to a position in which the wheel jack's wheel support assemblies 24 are disposed adjacent (e.g., on) the support surface (e.g., a support surface that is supporting the wheel jack 1). The user may then roll the vehicle away from the vehicle jack 1.

CONCLUSION

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A wheel engagement mechanism for operation with a jack for engaging two wheels of a multi-wheeled vehicle, comprising:
- a base; and
- a lift frame mounted adjacent to the base for engaging the wheels, comprising:
- a first wheel support assembly and an adjacent second wheel support assembly, each wheel support assembly supporting a wheel, comprising:
  - a rectangular frame including:
    - a front support for supporting a front of the wheel;
    - a rear support for supporting a rear of the wheel;
- a ratchet mechanism connected to the lift frame for selectively supporting the lift frame in an elevated position, the ratchet mechanism comprising:
  - a toothed bar, the toothed bar including a plurality of teeth; and
  - an engagement member connected to the lift frame; and
- a mechanism whereby the toothed bar is movable upwardly and away from the engagement member such that the engagement member disengages from the toothed bar.

2. The wheel engagement mechanism of claim 1 used with a jack, further comprising a lift frame elevation assembly connected to the lift frame for selectively raising and selectively lowering the lift frame.

3. The wheel engagement mechanism of claim 2, wherein the lift frame elevation assembly is an automatic drive.

4. The wheel engagement mechanism of claim 2, wherein the lift frame elevation assembly further comprises a pushing force member having a first end and a second end, in which the first end is connected to the lift frame and the second end is connected to the base.

5. The wheel engagement mechanism of claim 1, wherein:
- the plurality of teeth extend outwardly from the toothed bar; and
- the engagement member is a pin.

6. The wheel engagement mechanism of claim 1 for use with a jack, further comprising:
- an upright support mounted adjacent to the base; and
- wherein the lift frame is mounted to the upright support.

7. The wheel engagement mechanism of claim 1 for use with a jack, wherein the front support and back support are wheel support rollers.

8. A jack for lifting two wheels of a four wheeled vehicle off of a support surface, the jack comprising:
- a base supported by the support surface;
- an upright support having a first end and a second end, the first end mounted adjacent to the base;
- a lift frame connected to the upright support, the lift frame comprising a wheel support assembly for engaging the front wheels of the vehicle wherein each wheel front wheel is supported at a front by a wheel front support, and at a rear by a wheel rear support; and
- a lift frame elevation assembly connected to the upright support for selectively raising and selectively lowering the lift frame; and
- a ratchet mechanism connected to the lift frame for selectively supporting the lift frame in an elevated position, the ratchet mechanism comprising:
- a toothed bar, the toothed bar including a plurality of teeth;
- an engagement member connected to the lift frame, wherein the toothed bar remains stationary as the engagement member slidably engages the teeth of the toothed bar as the lift frame is elevated; and
- a mechanism whereby the engagement member disengages from the toothed bar by moving in a substantially upward direction.

9. The jack of claim 8, wherein the wheel front support and the wheel rear support are spaced apart within the wheel support assembly.

10. The jack of claim 9, wherein the wheel front support is a roller and the wheel rear support is a roller.

11. The jack of claim 8, wherein the wheel support assembly is adjustable on the lift frame for selectively positioning the wheel support assembly under the front wheel.

12. The jack of claim 8, wherein the upright support extends upwardly from the base.

13. The jack of claim 12, wherein the upright support extends substantially perpendicular to the base.

14. The jack of claim 12, wherein the lift frame elevation assembly further comprising a pulling force member having a first end connected to the lift frame and a second end connected adjacent to the second end of the upright support.

15. The jack of claim 12, wherein the lift frame elevation assembly further comprising a pushing force member having a first end and a second end, the first end connected to the lift frame and the second end connected to the base.

16. The jack of claim 12, further comprising a base handle mounted adjacent the second end of the upright support.

17. The jack of claim 12, wherein:

the lift frame further comprises a first roller and a second roller, wherein the first roller is disposed adjacent a front surface of the upright support and the second roller is disposed adjacent a rear surface of the upright support, and a channel is defined between the first and second rollers; and the upright support extends through the channel.

18. The jack of claim 17, wherein the lift frame further comprises a third roller and a fourth roller, wherein the third roller is disposed adjacent a first side surface of the upright support and the fourth roller is disposed adjacent a second side surface opposing and spaced apart from the first side surface of the upright support, and the channel is further defined between the third and fourth rollers.

19. The jack of claim 12, wherein at least one wheel is mounted adjacent a first end of the upright support.

20. A method of assembling a vehicle jack, comprising the steps of:

providing a base;

providing a wheel engagement mechanism including a first wheel support assembly and an adjacent second wheel support assembly, each wheel support assembly comprising a rectangular frame including a front support and a rear support;

connecting the wheel engagement mechanism to the base;

providing an elevation assembly including a first end and a second end;

connecting the elevation assembly first end to the wheel engagement mechanism;

connecting the elevation assembly second end to the base;

providing a ratchet mechanism comprising teeth connected to the base, and a ratchet engagement member connected to the wheel engagement mechanism, wherein the teeth remain stationary as the ratchet engagement member slidably engages the teeth as the wheel engagement mechanism is elevated; and providing a mechanism whereby the toothed bar is movable upwardly and away from the engagement member such that the engagement member disengages from the toothed bar.

21. The method of claim 20, wherein the elevation assembly is an automatic drive.

22. A wheel engagement mechanism for operation with a jack for engaging two wheels of a multi-wheeled vehicle, comprising:

a base; and a lift frame mounted adjacent to the base for engaging the wheels, comprising:

a first wheel support assembly and an adjacent second wheel support assembly, each wheel support assembly supporting a wheel, comprising:

a rectangular frame including:

a front support for supporting a front of the wheel;

a rear support for supporting a rear of the wheel; and a ratchet mechanism connected to the lift frame for selectively supporting the lift frame in an elevated position, the ratchet mechanism comprising:

a first toothed bar having a plurality of teeth;

a second toothed bar having a plurality of teeth mounted opposite the first toothed bar; and an engagement member connected to the lift frame and engaging both the first toothed bar and the second toothed bar for selectively supporting the lift frame.

* * * * *